United States Patent

Chi

[11] Patent Number: 6,131,245
[45] Date of Patent: Oct. 17, 2000

[54] FASTENING RING STRUCTURE

[76] Inventor: Meng Yu Chi, No. 139-5, An-Mei Road, Mei Shan Tsun, Hou-Li Hsiang, Taichung Hsien, Taiwan

[21] Appl. No.: 09/333,707

[22] Filed: Jun. 16, 1999

[51] Int. Cl.[7] .................................................. B65D 63/02
[52] U.S. Cl. ...................................... 24/20 R; 24/20 CW
[58] Field of Search .............................. 24/20 R, 20 EE, 24/20 CW, 20 TT, 21, 22, 23 R, 23 EE

[56] References Cited

U.S. PATENT DOCUMENTS

| | | | |
|---|---|---|---|
| 3,659,318 | 5/1972 | Timmerbeil et al. | 24/20 EE |
| 5,105,509 | 4/1992 | Lilley | 24/20 R |
| 5,235,729 | 8/1993 | Tiegs et al. | 24/20 CW |
| 5,881,437 | 3/1999 | Lilley | 24/20 CW |

*Primary Examiner*—James R. Brittain
*Attorney, Agent, or Firm*—Rosenberg, Klein & Lee

[57] ABSTRACT

A fastening ring structure includes a metallic strap formed with a U-shaped bending section spaced from one end of the strap by a predetermined distance. Two ends of the bending section are formed with a first and a second sections. The second section is formed with multiple engaging holes at equal intervals. Two inner engaging hooks project from inner side of the first section toward the bending section. Two outer engaging hooks and a locating plate project from outer side of the first section toward the bending section. Two ends of the strap are curved into a circular shape with the first section overlapping the second section on inner or outer side thereof. The inner or outer engaging hooks and locating plate of the first section are engaged in the engaging holes of the second section to form a fastening ring. The inner or outer engaging hooks can be engaged in different engaging holes to achieve a longer adjustment length of the fastening ring.

2 Claims, 5 Drawing Sheets

FASTENING RING STRUCTURE

BACKGROUND OF THE INVENTION

The present invention relates to an improved fastening ring structure which has longer adjustment length.

FIGS. 5 and 6 show a conventional fastening ring 70 having a bending section 71. One side of the bending section 71 is formed with multiple engaging holes 72. The other side of the bending section 71 is disposed with multiple engaging hooks 73. Different engaging hooks 73 are engaged in different engaging holes 72 and then the bending section 71 is bent and contracted, whereby the fastening ring 70 can tightly bind different sizes of dustproof sleeves of a car transmission shaft.

When using the fastening ring 70 to fasten a relatively small diameter article, some of the engaging hooks 73 will be overlapped on inner face of the fastening ring 70 to increase the outer diameter of the fastening ring 70. This will make the fastening ring 70 suffer an uneven force when fastened. Moreover, the fastening ring, 70 can hardly tightly attach to the article and may loosen. In addition, in the case that the engaging, hooks 73 are overlapped on inner side of the bending section 71, when fastening the bending section 71, the engaging, hooks 73 will prevent the entire fastening ring 70 from being tightly fastened. Also, two adjacent engaging hooks 73 are difficult to engage into the engaging holes 72 at the same time and will interfere with each other. This leads to inconvnience in use.

FIGS. 7 and 8 show another conventional fastening ring 80 in which one side of the bending section 81 is formed with multiple engaging holes 82 and the other side of the bending section 81 is disposed with multiple engaging hooks 83. Different engaging hooks 83 are engaged in different engaging holes 82 so that the fastening ring 80 can tightly bind different sizes of dustproof sleeves.

When using the fastening ring 80 to fasten a relatively small diameter article, the engaging hooks 83 will be closer to the bending section 81. In addition, the engaging hooks 83 outward extend and the engaging holes 82 are positioned on outer side of the engaging hooks 83 so that after fastened, the section with the engaging holes 82 distal from the bending section 81 will be curved upward. When the transmission shaft of the car operates, the upward curved section tends to hook alien articles or even lead to loosening and detachment of the fastening ring 80.

SUMMARY OF THE INVENTION

It is therefore a primary object of the present invention to provide a fastening ring structure in which the inner and outer engaging hooks projecting from inner and outer faces of the first section are respectively engaged in different engaging holes of the second section, whereby the fastening ring has a longer adjustment length.

It is a further object of the present invention to provide the above fastening ring structure in which a locating plate is engaged with a remaining length of the second section so as to prevent the end of the second section from being curved upward to hook with alien articles.

According to the above objects, the fastening, ring structure of the present invention including a metallic strap formed with a U-shaped bending section spaced from one end of the strap by a predetermined distance. Two ends of the bending section are formed with a first and a second sections. A length of the first section is larger than that of the second section. The second section is formed with multiple engaging holes at equal intervals and two inner engaging hooks project from inner side of the first section near an end section thereof. The inner engaging hooks project in a direction directed toward the bending, section. Two outer engaging hooks project from outer side of the first section spaced from the end section by a predetermined distance. The outer engaging hooks project in a direction directed toward the bending section. A locating plate projects from an outer side spaced from one end of the outer engaging hooks by a predetermined distance distal from the inner engaging hooks. The locating plate projects in a direction identical to that of the outer engaging hooks. Two ends of the strap are curved into a circular shape with the first section overlapping the second section on inner or outer side thereof and the inner or outer engaging hooks and locating plate of the first section are engaged in the engaging holes of the second section to form a fastening ring.

The present invention can be best understood through the following description and accompanying drawings wherein:

DETAILED DESCRIPTION OF THE PREFERRED EMBODIMENT

Figure 1:
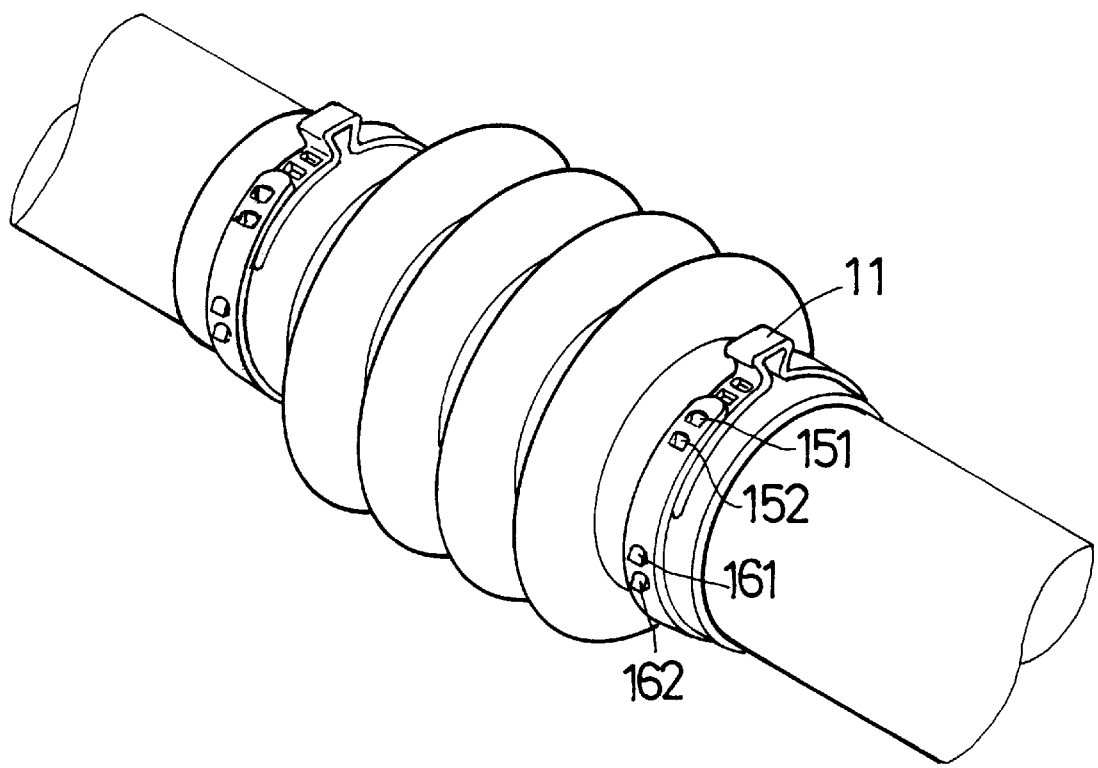
FIG. 1 is a perspective view showing the application of the fastening ring of the present invention.
Figure 2:
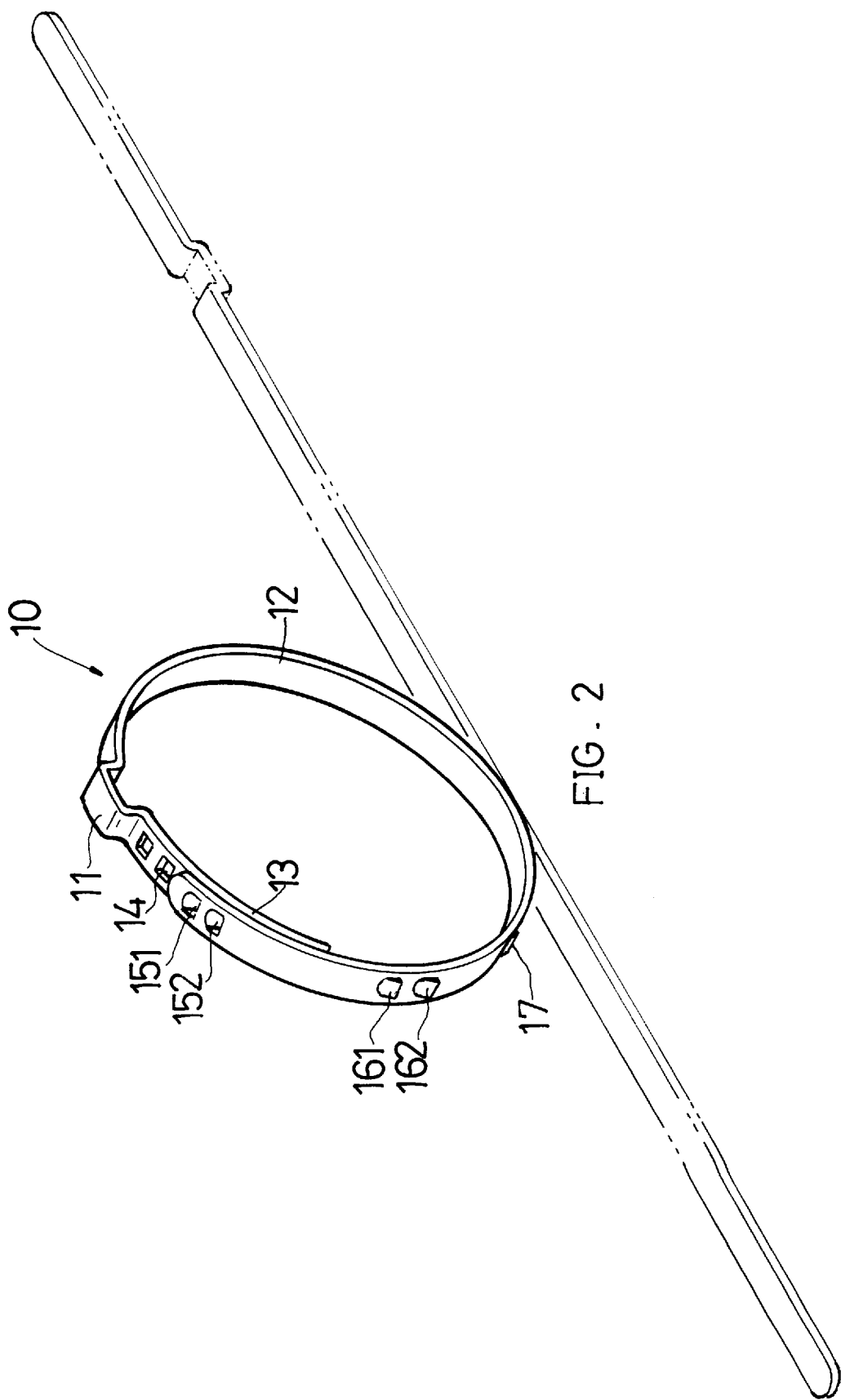
FIG. 2 is a perspective view of the fastening ring of the present invention.

Please refer to FIGS. 1 and 2. According to a preferred embodiment of the present invention, the fastening ring includes a metallic strap 10 formed with a U-shaped bending section 11 spaced from one end of the strap by a predetermined distance. Two ends of the bending section 11 are formed with a first and a second sections 12, 13. The length of the first section 12 is larger than that of the second section 12.

The second section 13 is formed with eight engaging holes 14 at equal intervals. Two inner engaging hooks 151, 152 project from inner side of the first section 12 near an end thereof. The inner engaging hooks 151, 152 project in a direction directed toward the bending section 11. Two outer engaging hooks 161, 162 project from outer side of the first section 12 and are spaced from the end section thereof. The distance between the inner engaging hooks 151, 152 and the outer engaging hooks 161, 162 is about equal to the interval between the engaging holes 14 of the second section 13. The outer engaging hooks 161, 162 projeet in a direction directed toward the bending section 11. A locating plate 17 projects from an outer side spaced from one end of the outer engaging hooks 161, 162 distal from the inner engaging hooks 151, 152. The locating, plate 17 projects in a direction identical to that of the outer engageing hooks 161, 162. The inner and outer engagang hooks 152, 162 of the adjacent inner or outer engaging hooks 151, 152, 161, 162 distal from the end section of the first section 12 project by a higher height.

Figure 3:
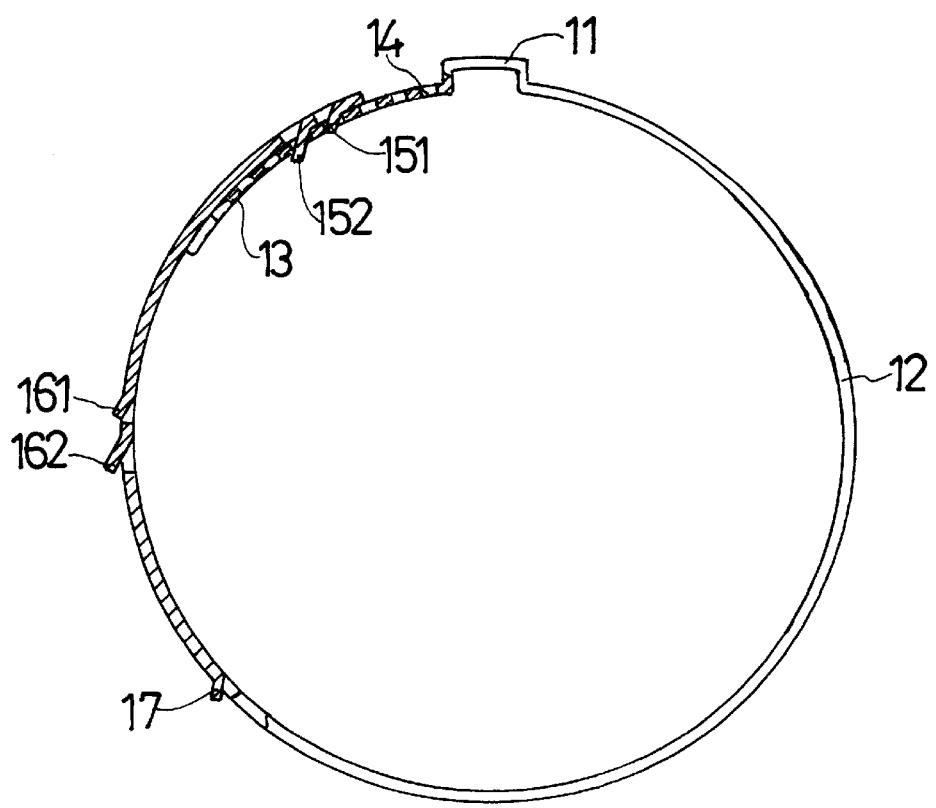
FIG. 3 is a sectional view showing the use of the fastening ring of the present invention in one state.
Figure 5:
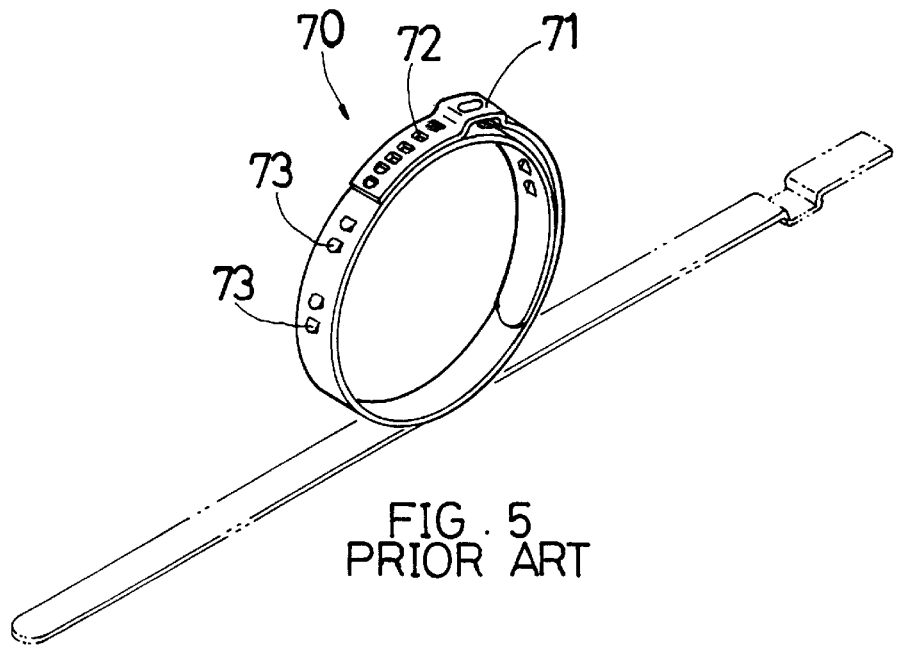
FIG. 5 is a perspective view of a conventional fastening ring.
Figure 6:
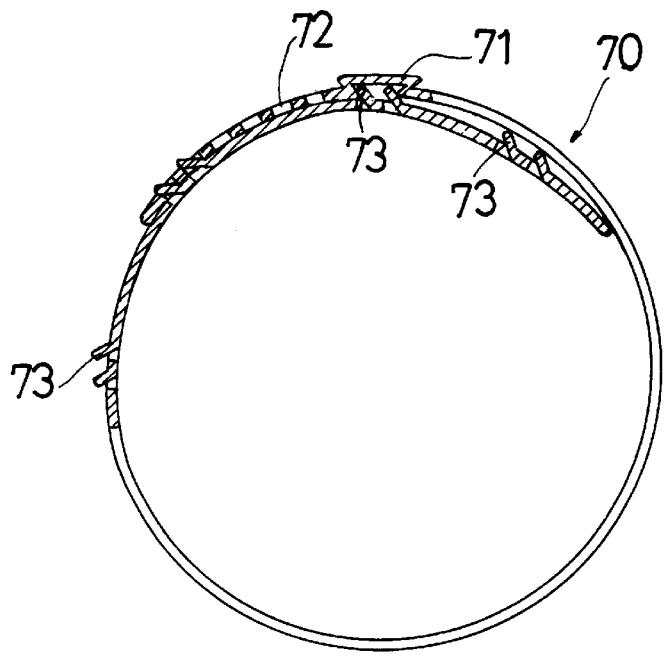
FIG. 6 is a sectional view showing the use of the conventional fastening ring of FIG. 5.
Figure 7:
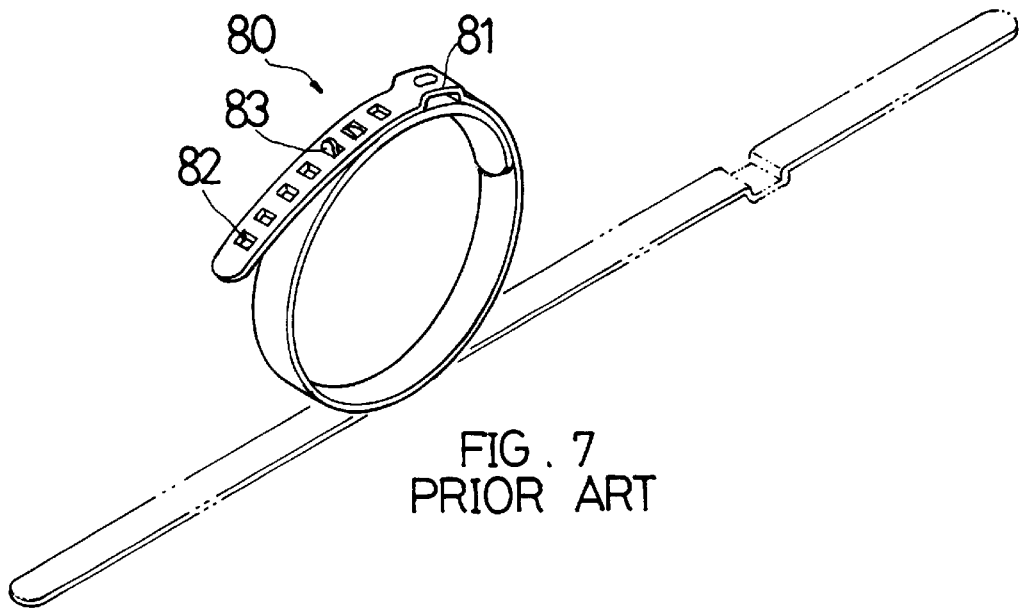
FIG. 7 is a perspective view of another conventional fastening ring.
Figure 8:
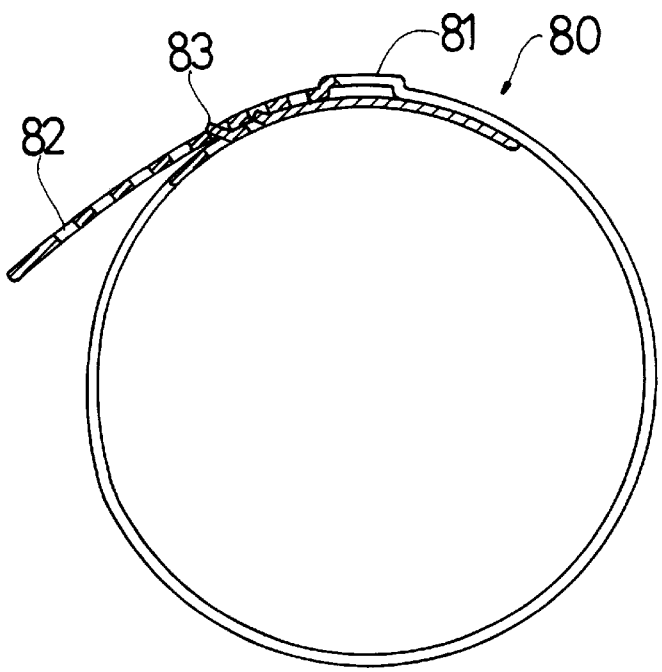
FIG. 8 is a sectional view of the conventional fastening ring of FIG. 7.

Referring to FIG. 3, when fastening a relatively large diameter dustproof sleeve, two ends of the strap 10 are first curved into a circular shape with the first section 12 overlapping the second section 13 on outer side thereof. The two inner engaging hooks 151, 152 are engaged in the engagineg holes 14 and then the bending section 11 is bent and contracted, making the fastening ring tightly bind the dustproof sleeve.

When engaged, the first section 12 overlaps the second section 13 on outer side thereof, whereby the inner side of the strap 10 can tightly attach to the dustproof sleeve for tightly binding the same. The relatively outward projecting inner enaging hook 152 can firmly hook with the engaging hole 14. The other inner engaging hook 151 are accurately engaged in the engaging hole 14 so as to enhance the engaging effect of the inner engaging hooks 151, 152.

Figure 4:
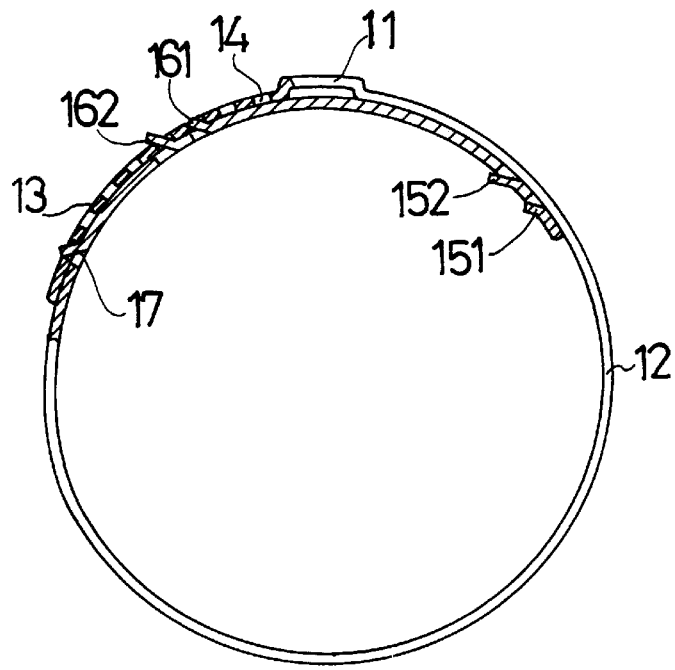
FIG. 4 is a sectional view showing the use of the fastening ring of the present invention in another state.

Referring to FIG. 4, when fastening a relatively small diameter dustproof sleeve, two ends of the strap 10 are first curved into a circular shape with the first section 12 overlapping the second section 13 on inner side thereof. The two outer engaging hooks 161, 162 are engaged in the engaging holes 14 and the locating plate 17 is engaged in the engaging hole 14 of the second section 13 near the end. Therefore, the end of the second section 13 will not be curved upward. Then the bending section 11 is bent and contracted making the fastening ring tightly bind the dustproof sleeve.

When engaged, the first section 12 overlaps the second section 13 on inner side thereof and the overlapping faces of the first and second sections 12, 13 are both plane faces, whereby the inner side of the strap 10 can tightly attach to the dustproof sleeve for tightly binding the same. The relatively outward projecting outer engaging hook 162 can firmly hook with the engaging hole 14. The other inner engaging, hook 161 are accurately engaged in the engaging hole 14 so as to enhance the engaging effect of the outer engaging hooks 161, 162. Moreover, the two inner engaging hooks 151, 152 project inward, whereby when fastened, the inner engaging hooks 151, 152 will insert into the dustproof sleeve to achieve a more reliable fastening effect.

According to the above arrangement, the inner and outer engaging hooks 151, 152, 161, 162 projecting from the inner and outer sides of the first section 12 are respectively engaged in different engaging holes 14 of the second section 13. The adjustable length of the fastening ring is about twice the interval between the eight engaging holes 14. Moreover, the locating plate 17 can be engaged in the engaging holes 14 of the remaining length of the second section so as to prevent the end of the second section from being curved up to hook with alien articles.

The above embodiment is only used to illustrate the present invention, not intended to limit the scope thereof. Many modifications of the above embodiment can be made without departing from the spirit of the present invention.

What is claimed is:

1. A fastening ring structure comprising a metallic strap formed with a U-shaped bending section spaced from one end of the strap by a predetermined distance, two ends of the bending section being formed with a first and a second sections, a length of the first section being larger than that of the second section, wherein:

the second section is formed with multiple engaging holes at equal intervals and two inner engaging hooks project from an inner side of the first section near an end section thereof, the inner engaging hooks projecting in a direction directed toward the bending section, two outer engaging hooks projecting from an outer side of the first section spaced from the end section by a predetermined distance, the outer engaging hooks projecting in a direction directed toward the bending section, a locating plate projecting from an outer side spaced from one end of the outer engaging hooks by a predetermined distance distal from the inner engaging hooks, the locating plate projecting in a direction identical to that of the outer engaging hooks.

2. A fastening ring structure as claimed in claim 1, wherein the inner and outer engaging hooks of the adjacent inner or outer engaging hooks distal from the end section of the first section project by a higher height.

* * * * *